2 Sheets—Sheet 1.

G. W. SMITH & J. H. GILL.
NUT-LOCK.

No. 177,665. Patented May 23, 1876.

WITNESSES:
Colborne Brookes
J. R. Holderby

George W. Smith
James H. Gill
INVENTORS per R. S. & N. P. Geary
ATTORNEYS

N. PETERS, PHOTO-LITHOGRAPHER, WASHINGTON, D. C.

2 Sheets—Sheet 2.

G. W. SMITH & J. H. GILL.
NUT-LOCK.

No. 177,665. Patented May 23, 1876.

WITNESSES:
Colborne Brookes
J. B. Holderby

George W. Smith
James H. Gill    INVENTORS per R. S. & A. P. Lacey    ATTORNEYS

UNITED STATES PATENT OFFICE.

GEORGE W. SMITH AND JAMES H. GILL, OF MOUNT PLEASANT, OHIO.

IMPROVEMENT IN NUT-LOCKS.

Specification forming part of Letters Patent No. 177,665, dated May 23, 1876; application filed February 16, 1876.

*To all whom it may concern:*

Be it known that we, GEORGE W. SMITH and JAMES H. GILL, of Mount Pleasant, in the county of Jefferson and State of Ohio, have invented certain new and useful Improvements in Nut-Locks; and we do hereby declare that the following is a full, clear, and exact description thereof, which will enable others skilled in the art to which it pertains to make and use the same, reference being had to the accompanying drawing, and to the letters of reference marked thereon, which form a part of this specification.

Our invention relates to improvements in nut-locks, the nature of which will be fully explained by reference to the drawings, in which—

Figure 1:
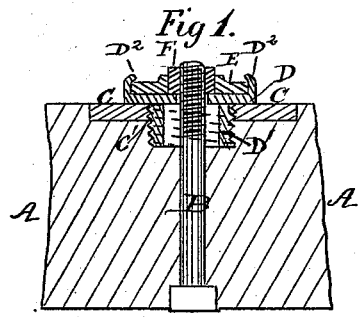
Figure 2:
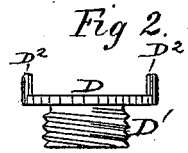
Figure 3:
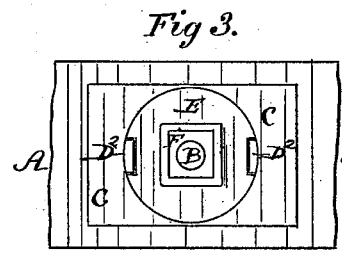
Figures 4, 5:
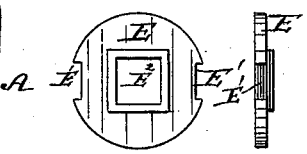
Figure 6:
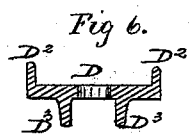
Figure 7:
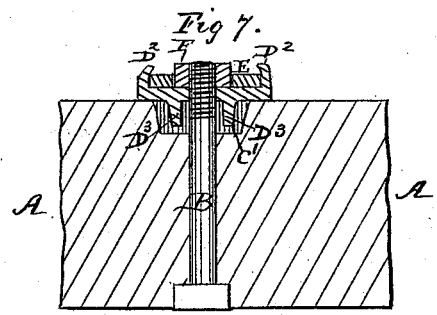
Figure 8:
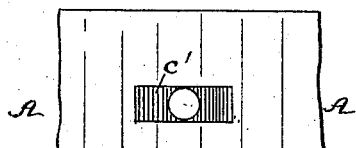
Figure 9:
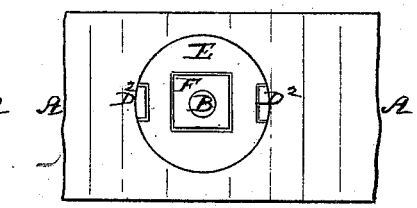
Figure 10:
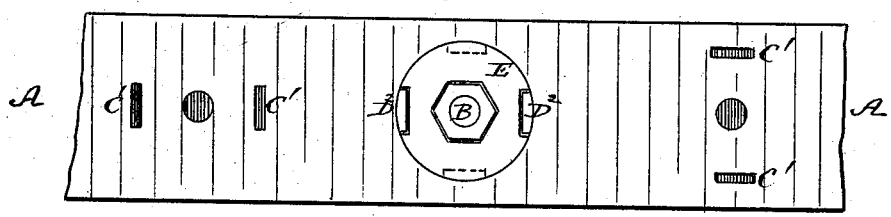
Figure 11:
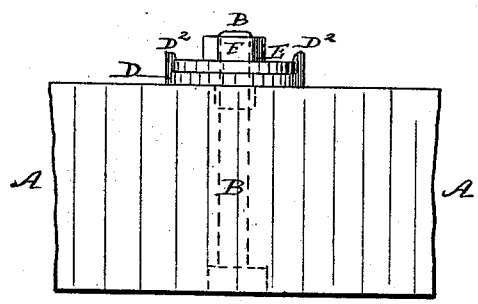
Figure 12:
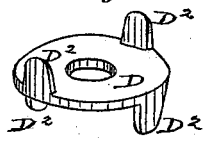
Figure 13:
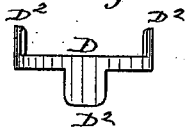

Figure 1 represents a sectional view, and Fig. 3 a plan, of portion of a beam with a bolt applied thereto, the nut of which is locked according to our invention. Figs. 2, 4, and 5 show detail views of parts separately. Figs. 6, 7, 8, 9, 10, 11, 12, and 13 show detail views and slight modifications of our invention as represented by Figs. 1 to 5.

In each of the views similar letters of reference are employed to indicate corresponding parts wherever they occur.

A represents a beam or timber, and B a bolt passing therethrough. C is a face-plate applied to the side or edge of the timber A, and provided with a central aperture, $C'$, formed with a female thread, adapted to receive and hold a male thread formed on the exterior surface of a hollow shank, $D^1$, formed on the under side of a retaining-plate, D, the upper surface of which is, by preference, perfectly flat, and provided with projecting lugs $D^2$, adapted to be received within notches or recesses $E^1$ in a locking-plate, E, formed with a central aperture, $E^2$, adapted to receive the nut F.

The operation of the device is as follows: The bolt A is first passed into position, with its threaded end passing through the central aperture $C'$ of the plate C. The retaining-plate D is then screwed into position, as shown by Fig. 1. The nut F is then applied, after which the locking-plate is then dropped into position, as shown clearly by Fig. 3. This having been done, the upper ends of the lugs $D^2$ are bent or turned over the locking-plate E, as shown by Fig. 1, when the whole will be securely held together.

In Figs. 6, 7, 8, and 9, we have shown a slight modification of our invention. In this case, in place of employing a hollow shank, $D^1$, on the retaining-plate D, we employ simply projections $D^3$, or segments of a shank, by preference formed without screw-threads, and adapted to fit into a socket or hole, $C'$, formed in the surface of the beam or timber A, or in a plate applied thereto. In other respects the device is identical in construction and operation to that shown by the previous figures.

In Figs. 10, 11, 12, and 13, we have shown another slight modification of our invention. In this case the retaining-plate D is formed with pairs or series of lugs $D^2$ on each side thereof, the pair or series on the one side being arranged, by preference, at right angles to the other, and adapted so that either pair or series of lugs $D^2$ may be used to hold the locking-plate E, while the other series is employed to hold the plate D by being inserted in holes or recesses $C'$ in the timber, formed previously, or by forcing the lugs into the surface, or in a face-plate applied to the surface of the timber, as may be found most convenient.

The operation of the devices in other respects is similar to the modifications previously described.

Having thus described our invention, what we claim, and desire to secure by Letters Patent, is—

1. A retaining-plate, D, having a threaded shank, $D^1$, and lugs or projections $D^2$, substantially as and for the purpose described.

2. The combination, with a retaining-plate, D, having a threaded shank, $D^1$, and lugs or projections $D^2$, of the locking-plate E, formed with notches or recesses $E^1$ and a central aperture, $E^2$, substantially as and for the purpose described.

3. The combination, with a retaining-plate, D, formed with alternate pairs or series of lugs $D^2$ on opposite sides thereof, of a locking-plate, E, formed with notches or recesses $E^1$ and a central aperture, $E^2$, substantially as and for the purpose specified.

In testimony that we claim the foregoing as our own we hereto affix our signatures in presence of two witnesses.

GEORGE W. SMITH.
J. H. GILL.

Witnesses:
GEORGE W. TWEEDY,
NOBLE C. BROWN.